F. H. KIERSTEAD.
REACTOR IN TANKS.
APPLICATION FILED FEB. 3, 1920.

1,394,910.

Patented Oct. 25, 1921.
2 SHEETS—SHEET 1.

Inventor:
Friend H. Kierstead
by Albert G. Davis
His Attorney

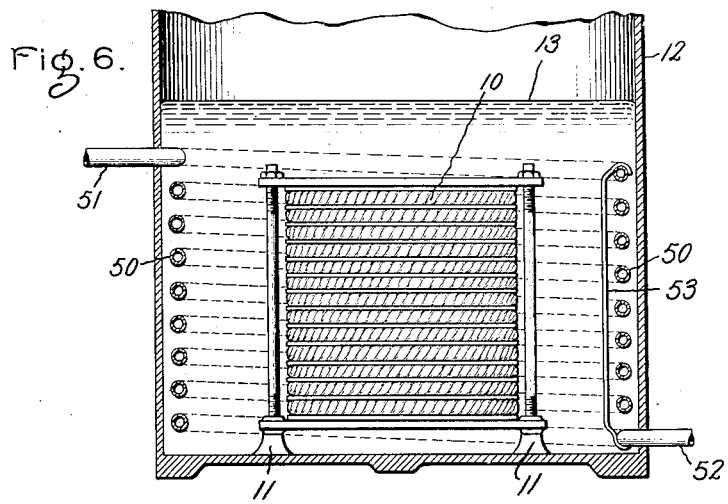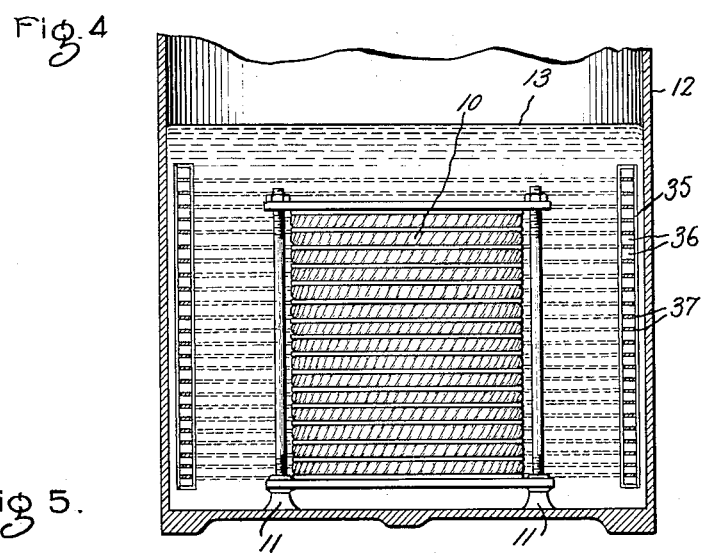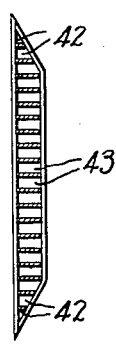

UNITED STATES PATENT OFFICE.

FRIEND H. KIERSTEAD, OF PITTSFIELD, MASSACHUSETTS, ASSIGNOR TO GENERAL ELECTRIC COMPANY, A CORPORATION OF NEW YORK.

REACTOR IN TANKS.

1,394,910.  Specification of Letters Patent.  Patented Oct 25, 1921

Application filed February 3, 1920. Serial No. 356,081.

*To all whom it may concern:*

Be it known that I, FRIEND H. KIERSTEAD, a citizen of the United States, residing at Pittsfield, in the county of Berkshire, State of Massachusetts, have invented certain new and useful Improvements in Reactors in Tanks, of which the following is a specification.

My invention relates to reactors, some transformers, and like apparatus, and has for its object an improved and economical arrangement of parts, particularly adapted for large sized units.

Inductively related windings arranged to serve mainly as reactors, designedly have air cores (or at least cores devoid of iron or material having so-called ferro-magnetic properties, and here referred to as air core types) in order that the inductance of such reactor for changing voltages shall have a so-called "straight line characteristic" or nearly so. Consequently air core type reactors to which I mainly contemplate applying my invention have a comparatively extensive stray magnetic field or leakage flux.

In reactors and like apparatus designed in large sizes and for high duty, it is generally necessary that such apparatus be immersed in a bath of a cooling and insulating medium other than air, such for instance as oil, in order to dissipate properly the heat generated in the apparatus during service, such medium being as a rule, retained in a metal container, such as iron or steel.

As a consequence large reactors of the air core type, by reason of their stray flux, are likely to have not only a disturbing influence on adjacent apparatus, but also to be subject to very great losses if placed in an iron or steel container, such stray fields inducing large eddy currents in the walls of the container. To avoid these losses by making the container of other than a metal is not practical since, for a given bulk, weight and duty, metal is substantially the only available material of construction.

In the practice of my invention I avoid both of these objections by an improved shielding device of continuous conducting non-magnetic material which I have devised and arranged to be cut by stray magnetic flux so as to restrict the main flux substantially within predetermined limits.

Figure 1:
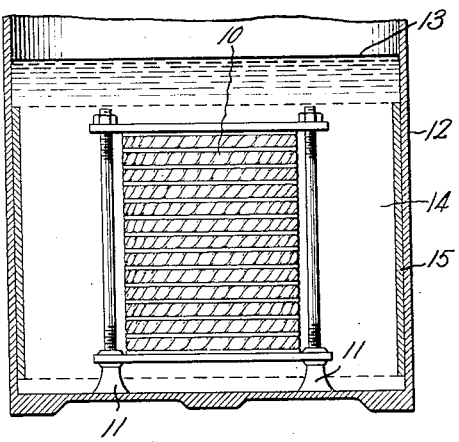
Figure 2:
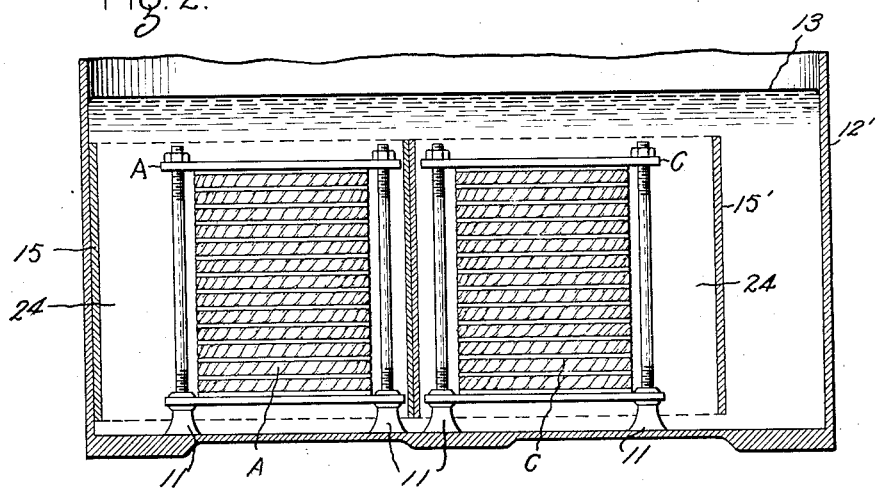
Figure 3:
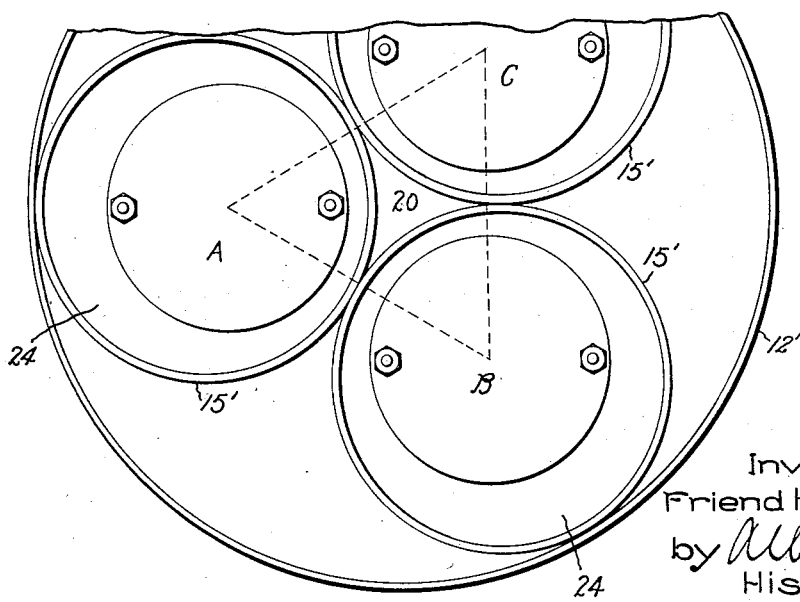

For a more complete understanding of the nature and objects of my invention reference should be had to the following detailed description when taken in connection with the accompanying drawings in which Figure 1 shows mainly in section an air core type of reactor in a metallic container having my invention applied thereto. Figs. 2 and 3 similarly show polyphase reactors in a metallic container having my invention applied thereto. Figs. 4, 5 and 6 show modified arrangements for applying my invention to the type of reactor shown in Fig. 1.

Referring now to the drawings, and to Fig. 1 in particular, 10 represents an air core type reactor, mounted on suitable supports 11 in the metallic container 12, whose walls will hereinafter be referred to as made from steel. Within the tank or container 12, and in which the reactor 10 is submerged, is the cooling and insulating medium 13 which will hereinafter be referred to as oil. Between the exterior contour or the reactor 10 and the wall of the tank 12, I provide the space 14, of generally annular configuration in which I confine the stray flux or magnetic field emanating from the reactor 10. To accomplish the confining of the stray flux in this space, I provide the magnetic shield 15 disposed about the interior surface of the wall of tank 12.

In its simplest form this shield, as shown in Fig. 1, consists of a sheet of copper, or other conducting metal of low resistivity, secured on the interior of the wall of tank 12, the adjacent edges of which sheet are placed in conducting relation so that a short-circuited current will flow in such sheet when the rector 10 is in service. The action of the current flowing in this magnetic shield during service is such as to produce a bucking magnetic field which prevents the stray flux emanating from the reactor 10, from passing beyond the shield; hence the flux emanating from reactor 10 must traverse the space 14 provided therefor and will be confined thereto.

When applying my invention to reactors in polyphase service, I preferably arrange the reactors symmetrically with respect to each other so that the resultant flux between them is zero, or substantially so. Thus for three phase service the reactors A, B and C are placed in the oil containing tank 12' so that their axes pass through the vertices of an equilateral triangle. The flux passing centrally between them, *i. e.*, the flux space 20, is then substantially zero. The reactors A, B and C consequently may be relatively close together, the electrical clearance for insulating purposes being the determining factor when computing such spacing. The reactors A, B and C however must be sufficiently spaced from the walls of tank 12' to permit the flux emanating therefrom to be confined therein by means of shields 15'; which shields are here shown as circular in form, but any convenient form may be used. The action of the current in the shields 15' for the polyphase reactors not only tends to confine the stray flux within the spaces 24 but also compensates in a measure for any unbalancing of the currents in the phases which may occur.

Instead of using the simple form of magnetic shield shown in Fig. 1, I may use a modified form which convenience or expediency may indicate. I will now describe several such forms that I contemplate using.

In Fig. 4 I have shown the reactor 10 again submerged in a steel tank 12 having a magnetic shield 35 disposed about the interior of the wall of tank 12. The shield 35 is composed of a plurality of copper rings or strips 36 separated from each other by suitable material shown at 37. This from of shield has the advantage that it more uniformly distributes the bucking field than the plain sheet and prevents the field from easily becoming distorted and ineffective.

In Fig. 5 I have shown a still further modified arrangement of the rings or strips forming the magnetic shield according to the arrangement of Fig. 4. Here the rings 42 at the top and bottom of the shield are made of relatively small cross sections as compared with rings 43 near the middle of the shield since these top and bottom rings are cut by relatively little stray flux and hence carry a relatively small short-circuited current; while those near the middle carry a relatively large current.

In Fig. 6 instead of using copper rings to form the magnetic shield, I have indicated an arrangement for forming such shield which takes advantage of the cooling coils which are employed for cooling the oil in tank 12 whenever such cooling coils are made use of. About the interior of the walls of tank 12 the cooling coil 50 is disposed through which cool water or other suitable auxiliary cooling medium circulates for cooling the oil. The coil 50 which I employ is preferable made of copper both on account of its electrical properties and on account of its thermal properties, for as is well known, copper has very high thermal conductivity. The coil 50 is shown as of a generally spiral form having inlet and outlet 51 and 52 penetrating the walls of tank 12. In order that the short-circuited current in this coil may be wholly confined thereto, or substantially so, I provide the vertical short circuiting connection 53 which is conductively connected to the top and bottom convolutions of the coil 50. It will be understood that this coil produces substantially the same magnetic shielding action as those heretofore described by reason of the provision for the substantially unimpeded flow of the short-circuited current; the shielding action being in addition to the normal cooling function of the coil 50.

Having now described several embodiments of my invention which are at present the best means known to me for carrying the same into effect, I would have it understood that these are merely illustrative and that I do not mean to be limited thereby to the precise details shown, nor restricted in the choice of recognized equivalents except as defined in my claims hereunto annexed.

What I claim as new and desire to secure by Letters Patent of the United States, is:—

1. In air core type reactors and the like, the combination with windings, of a container adapted to hold a cooling and insulating medium in contact with said windings, and continuous conducting non-magnetic means disposed about the walls of said container and arranged to confine the main flux emanating from said windings within predetermined limits.

2. In air core type reactors and the like, the combination with windings, of a container adapted to hold a cooling and insulating medium in contact with said windings, and a shield comprising continuous conducting non-magnetic material adapted to be traversed by stray magnetic flux to induce short circuited current therein for confining the main flux within predetermined limits; said shield being disposed about the interior wall of said container.

3. In air core type reactors and the like, the combination with windings, of a container adapted to hold a cooling and insulating medium in contact with said windings, and a shield comprising a plurality of electrical conductors of low resistivity arranged in the path of the stray flux and adapted to be traversed by short circuited current said shield being secured about the interior wall of said container.

In witness whereof, I have hereunto set my hand this 29th day of Jan., 1920.

FRIEND H. KIERSTEAD.